US012701599B2

(12) United States Patent
Zhang et al.

(10) Patent No.: US 12,701,599 B2
(45) Date of Patent: Aug. 4, 2026

(54) METHOD FOR REDUCING INTERFERENCE BETWEEN RADAR AND UPLINK FREQUENCY BAND AND COMMUNICATION APPARATUS

(71) Applicant: Huawei Technologies Co., Ltd., Shenzhen (CN)

(72) Inventors: Liwen Zhang, Shanghai (CN); Liangliang Li, Madrid (ES); Xu Wang, Shanghai (CN); Zhou Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 516 days.

(21) Appl. No.: 18/146,688

(22) Filed: Dec. 27, 2022

(65) Prior Publication Data

US 2023/0137479 A1     May 4, 2023

Related U.S. Application Data

(63) Continuation of application No. PCT/CN2021/102654, filed on Jun. 28, 2021.

(30) Foreign Application Priority Data

Jun. 30, 2020     (CN) ......................... 202010617244.X

(51) Int. Cl.
H04W 72/541      (2023.01)
G01S 7/02        (2006.01)
H04W 72/0453     (2023.01)

(52) U.S. Cl.
CPC ........... H04W 72/541 (2023.01); G01S 7/023 (2013.01); H04W 72/0453 (2013.01)

(58) Field of Classification Search
CPC ...... G01S 7/023; H04J 11/0023; H04K 3/226; H04K 3/822; H04L 5/001; H04L 5/0062; H04W 16/14; H04W 72/0453; H04W 72/541
USPC .......................................... 370/329
See application file for complete search history.

(56) References Cited

U.S. PATENT DOCUMENTS

| | | | |
|---|---|---|---|
| 7,230,566 B2 | 6/2007 | Theobold et al. | |
| 9,894,534 B2 | 2/2018 | Boudreau et al. | |
| 10,397,793 B2 | 8/2019 | Sadek et al. | |
| 11,375,543 B2 | 6/2022 | Sanderovich et al. | |

(Continued)

FOREIGN PATENT DOCUMENTS

| | | |
|---|---|---|
| CN | 101084455 A | 12/2007 |
| CN | 105519160 A | 4/2016 |

(Continued)

*Primary Examiner* — Robert J Lopata
(74) *Attorney, Agent, or Firm* — Slater Matsil, LLP

(57) ABSTRACT

This application provides a method for reducing interference between a radar and an uplink frequency band. A first network device obtains a characteristic of a radar signal on the uplink frequency band, and determines a corresponding protection measure based on the characteristic of the radar signal, to reduce interference between the radar signal and the uplink frequency band. In this way, when 5G communication collides with the radar in time domain and frequency domain of the uplink frequency band, the 5G communication and the radar can still coexist. This improves utilization of a wireless spectrum.

20 Claims, 5 Drawing Sheets

(56)  References Cited

U.S. PATENT DOCUMENTS

| | | | |
|---|---|---|---|
| 2015/0063321 A1 | 3/2015 | Sadek et al. | |
| 2016/0285611 A1 | 9/2016 | Fischer et al. | |
| 2016/0338107 A1* | 11/2016 | Zeng | H04W 72/1268 |
| 2017/0094651 A1 | 3/2017 | Green et al. | |
| 2017/0164208 A1 | 6/2017 | Nielsen et al. | |
| 2017/0257773 A1* | 9/2017 | Boudreau | H04W 16/14 |
| 2018/0059213 A1 | 3/2018 | Wallstedt et al. | |
| 2020/0229102 A1* | 7/2020 | Gubeskys | H04W 52/146 |
| 2020/0235980 A1* | 7/2020 | John Wilson | H04L 5/0014 |
| 2020/0333456 A1 | 10/2020 | Ying et al. | |
| 2021/0076417 A1* | 3/2021 | Bayesteh | H04W 80/02 |
| 2023/0300810 A1* | 9/2023 | Xue | H04L 5/14 |
| | | | 370/280 |

FOREIGN PATENT DOCUMENTS

| | | | |
|---|---|---|---|
| CN | 108282789 A | 7/2018 | |
| CN | 108289325 A | 7/2018 | |
| CN | 108476410 A | 8/2018 | |
| CN | 109477885 A | 3/2019 | |
| JP | 2013235394 A | 11/2013 | |
| TW | 201830943 A | 8/2018 | |
| WO | 2015112197 A1 | 7/2015 | |
| WO | 2018132220 A2 | 7/2018 | |
| WO | 2019137536 A1 | 7/2019 | |

* cited by examiner

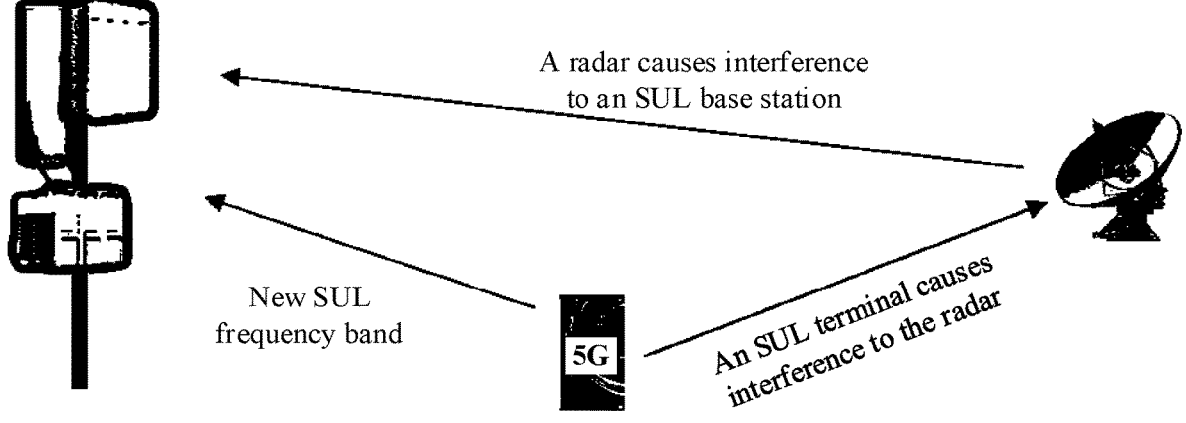

A radar causes interference
to an SUL base station

New SUL
frequency band

An SUL terminal causes
interference to the radar

FIG. 1

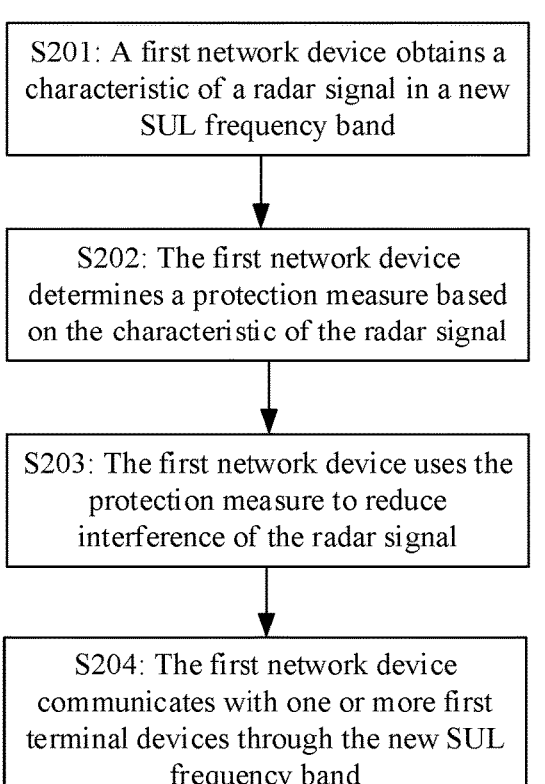

S201: A first network device obtains a
characteristic of a radar signal in a new
SUL frequency band S202: The first network device
determines a protection measure based
on the characteristic of the radar signal S203: The first network device uses the
protection measure to reduce
interference of the radar signal S204: The first network device
communicates with one or more first
terminal devices through the new SUL
frequency band

FIG. 2

METHOD FOR REDUCING INTERFERENCE BETWEEN RADAR AND UPLINK FREQUENCY BAND AND COMMUNICATION APPARATUS

CROSS-REFERENCE TO RELATED APPLICATIONS

This application is a continuation of International Application No. PCT/CN2021/102654, filed on Jun. 28, 2021, which claims priority to Chinese Patent Application No. 202010617244.X, filed on Jun. 30, 2020. The disclosures of the aforementioned applications are hereby incorporated by reference in their entireties.

TECHNICAL FIELD

This application relates to the communication field, and specifically, to a method for reducing interference between a radar and an uplink frequency band and a communication apparatus.

BACKGROUND

To enhance an uplink capability in a network architecture of a conventional 5th generation (5G) system, a new frequency band needs to be introduced. However, radio spectrum resources are congested, and the newly-introduced 5G frequency band interferes with a radar/wireless fidelity (Wi-Fi) system/satellite. Consequently, the systems cannot coexist. Currently, a super uplink solution can be used to avoid interference from a base station to the radar and make it possible for the radar to coexist with the 5G system. However, interference from the radar to the base station and interference from a supplementary uplink (SUL) terminal device to the radar still exist.

FIG. 1 is a schematic diagram of interference between the radar and a network system of the 5G system. As shown in FIG. 1, interference from the radar to the 5G system includes: Because a transmit power of the radar and a gain of a main lobe of an antenna are extremely large, in a severe case, for example, when the base station is located in a direction of a main lobe of the radar and is close to the main lobe of the radar, a circuit may be burnt. In another aspect, when radar interference is insufficient to burn the circuit, a channel environment of a 5G terminal device/base station deteriorates, and a bit error rate increases. In addition, interference from the 5G system to the radar includes that interference of the 5G terminal device/base station results in deterioration of radar sensitivity, causing a legal problem.

SUMMARY

This application provides a method for reducing interference between a radar and an uplink frequency band and a communication apparatus, to improve coexistence of a 5G system and the radar in a same frequency band.

According to a first aspect, a method for reducing interference between a radar and an uplink frequency band is provided. The method includes: A first network device obtains a characteristic of a radar signal in the uplink frequency band. The first network device determines a protection measure based on the characteristic of the radar signal. The first network device reduces interference between the radar signal and the uplink frequency band by using the protection measure. The first network device communicates with one or more first terminal devices through the uplink frequency band.

In the foregoing technical solution, because interference from a network device and a terminal device to the radar is avoided in the uplink frequency band, impact of a 5G system on the radar is greatly reduced. In addition, the protection measure is initiated by a network side, so that there is no need to have permission to control the radar.

With reference to the first aspect, in some implementations of the first aspect, the first network device determines the characteristic of the radar signal. Alternatively, the first network device receives the characteristic of the radar signal from a second terminal device.

In the foregoing technical solution, the characteristic of the radar signal may be determined by the network side, or may be determined by a terminal side.

With reference to the first aspect, in some implementations of the first aspect, the first network device sends the characteristic of the radar signal to at least one surrounding second network device.

In the foregoing technical solution, because the radar may simultaneously cause interference to a plurality of network devices that use the uplink frequency band, the first network device may send the determined characteristic of the radar signal to a surrounding network device, so that another network device may also perform a corresponding protection measure based on the characteristic of the radar signal.

With reference to the first aspect, in some implementations of the first aspect, the characteristic of the radar signal includes a transmission cycle of the radar signal, a location of a frequency domain resource of the radar signal, and/or energy of interference to the first network device in the transmission cycle and/or on the frequency domain resource.

With reference to the first aspect, in some implementations of the first aspect, in the transmission cycle of the radar signal, the first network device stops user scheduling in a cell corresponding to the uplink frequency band, or indicates that an uplink transmit power of the one or more first terminal devices in the transmission cycle does not exceed a first threshold. Alternatively, the first network device adjusts a length and/or a location of a CP, to enable the radar signal to fall in the CP. Alternatively, the first network device adjusts a quantity and/or locations of one or more GAP symbols, to enable the radar signal to fall on the one or more GAP symbols.

In the foregoing technical solution, the protection measure is performed on the network side or the terminal side, so that there is no need to have the permission to control the radar. In addition, a method, for example, a method for reducing a transmit power of a terminal, is used. In this way, when 5G communication collides with the radar in time domain and frequency domain of the uplink frequency band, the 5G communication and the radar can still coexist. This improves utilization of a wireless spectrum.

With reference to the first aspect, in some implementations of the first aspect, an intermediate radio frequency device corresponding to the frequency domain resource is deactivated, or a cell system bandwidth or a bandwidth part BWP in the uplink frequency band is adjusted, to avoid the frequency domain resource or indicate that an uplink transmit power of the one or more first terminal devices on the frequency domain resource does not exceed a second threshold. Alternatively, the first network device skips scheduling the frequency domain resource, or preferentially allocates the frequency domain resource to a near-point user in the cell corresponding to the uplink frequency band.

In the foregoing technical solution, the protection measure is performed on the network side or the terminal side, so that there is no need to have the permission to control the radar. In addition, the method, for example, the method for reducing a transmit power of a terminal, is used. In this way, when the 5G communication collides with the radar in time domain and frequency domain of the uplink frequency band, the 5G communication and the radar can still coexist. This improves the utilization of the wireless spectrum.

With reference to the first aspect, in some implementations of the first aspect, a downtilt of an antenna of the first network device is adjusted, to enable interference from the radar signal to the first network device to be less than a third threshold.

In the foregoing technical solution, a downtilt of a network device is adjusted. In this way, when the 5G communication collides with the radar in time domain and frequency domain of the uplink frequency band, the 5G communication and the radar can still coexist. This improves the utilization of the wireless spectrum.

With reference to the first aspect, in some implementations of the first aspect, the first network device repeatedly uses the protection measure to reduce the interference between the radar signal and the uplink frequency band.

According to a second aspect, a communication apparatus is provided. The communication apparatus has a function of implementing the method according to any one of the first aspect or the possible implementations of the first aspect. The function may be implemented by hardware, or may be implemented by hardware executing corresponding software. The hardware or the software includes one or more units corresponding to the function.

According to a third aspect, this application provides a network device, including a processor, a memory, and a transceiver. The memory is configured to store a computer program. The processor is configured to: invoke and run the computer program stored in the memory, and control the transceiver to receive and send a signal, so that the terminal device performs the method according to any one of the first aspect or the possible implementations of the first aspect.

According to a fourth aspect, this application provides a computer-readable storage medium. The computer-readable storage medium stores computer instructions. When the computer instructions are executed on a computer, the method according to any one of the first aspect or the possible implementations of the first aspect is implemented.

According to a fifth aspect, this application provides a computer program product. The computer program product includes a computer program or code. When the computer program or code is run on a computer, the method according to any one of the first aspect or the possible implementations of the first aspect is implemented.

According to a sixth aspect, this application provides a communication apparatus, including a processor and a communication interface. The communication interface is configured to receive a signal and transmit the signal to the processor, and the processor processes the signal, so that the method according to any one of the first aspect or the possible implementations of the first aspect is performed.

According to a seventh aspect, this application provides a wireless communication system, including the network device according to the third aspect.

BRIEF DESCRIPTION OF THE DRAWINGS

FIG. 1 is a schematic diagram of interference between a radar and a 5G network system;

FIG. 2 is a schematic flowchart of reducing interference between a radar and an uplink frequency band according to this application;

DETAILED DESCRIPTION OF ILLUSTRATIVE EMBODIMENTS

Figure 3:
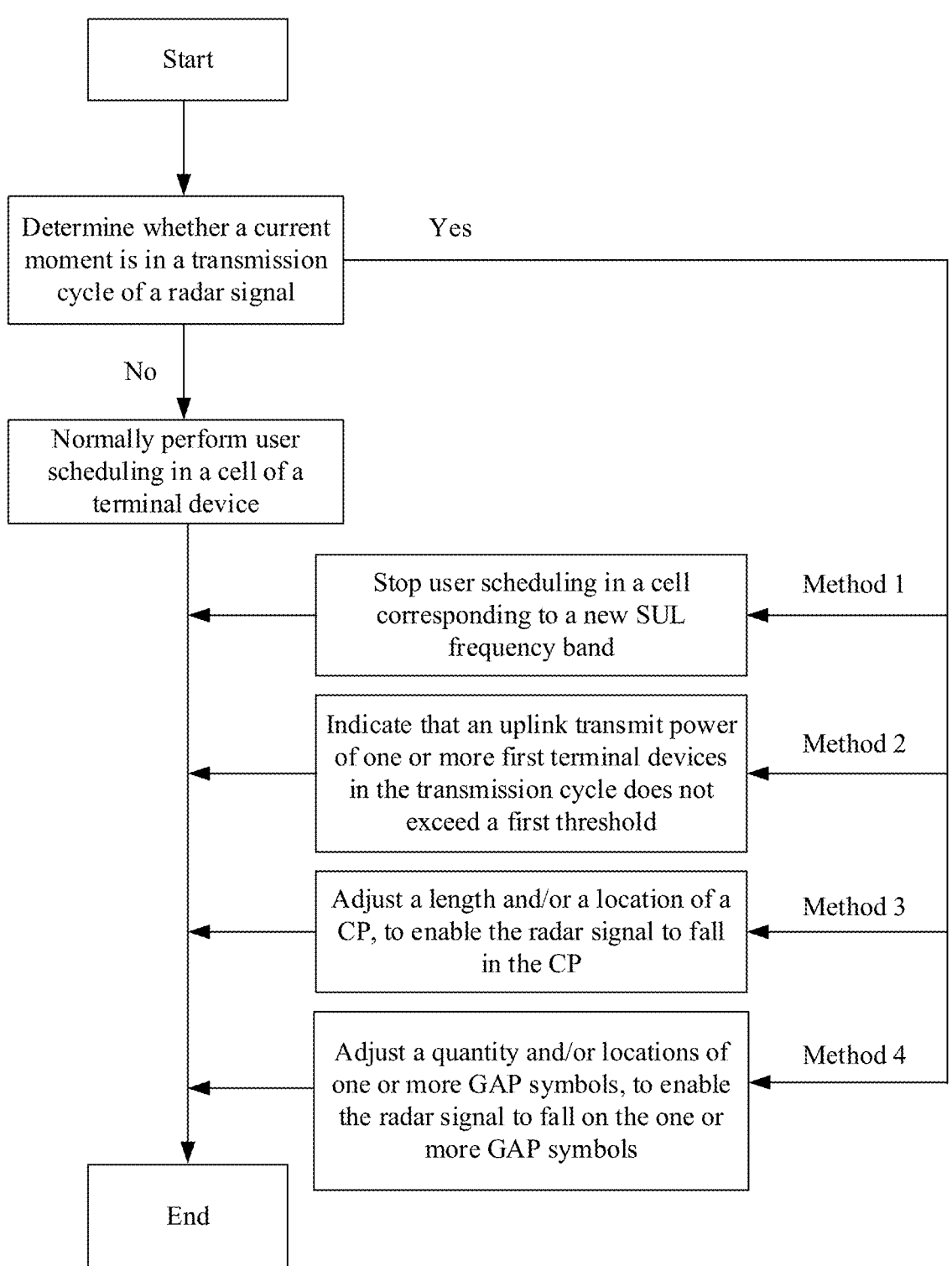
FIG. 3 is a schematic flowchart of implementing a time domain protection measure according to this application.

The following describes technical solutions of this application with reference to accompanying drawings.

Embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system, a new radio (NR) system, a device-to-device (D2D) communication system, a machine communication system, an internet of vehicles communication system, a satellite communication system, or a future communication system.

For ease of understanding embodiments of this application, a communication system applicable to embodiments of this application is first described in detail with reference to FIG. 1. The communication system may include at least one network device and at least one terminal device. The network device may communicate with the terminal device over a wireless link.

In embodiments of this application, the network device may be any device having a wireless transceiver function. The network device includes but is not limited to: an evolved NodeB (eNB), a radio network controller (RNC), a NodeB (NB), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the network device may be a gNB or a transmission point (TRP or TP) in a 5G (for example, NR) system, one antenna panel or a group of antenna panels (including a plurality of antenna panels) of a base station in the 5G system, or a network node, for example, a baseband unit (BBU) or a distributed unit (DU), that constitutes the gNB or the transmission point. Alternatively, the network device may be a satellite, a satellite gateway, or the like.

The network device in embodiments of this application may alternatively be a central unit (CU) or a distributed unit (DU). Alternatively, the network device may include a CU and a DU. It may be understood that the base station is divided into the CU and the DU from a perspective of logical functions. The CU and the DU may be physically separated, or may be deployed together. This is not specifically limited in embodiments of this application. One CU may be connected to one DU, or a plurality of DUs may share one CU. This can reduce costs and facilitate network expansion. CU-DU division may be performed based on a protocol stack. In a possible manner, a radio resource control (RRC) layer, a service data adaptation protocol (SDAP) layer, and a packet data convergence protocol (PDCP) layer are deployed in the CU, and a radio link control (RLC) layer, a media access control (MAC) layer, and a physical layer are deployed in the DU. The present invention is not completely limited to the foregoing protocol stack division manner, and there may be another division manner. For details, refer to TR 38.801v14.0.0. The CU is connected to the DU through an F1 interface. The CU representing a gNB is connected to a core network through an Ng interface.

The network device in embodiments of this application may alternatively be a central unit-control plane (CU-CP) node or a central unit-user plane (CU-UP) node. Alternatively, the network device may include a CU-CP and a CU-UP. The CU-CP is responsible for functions of a control plane, and mainly includes an RRC and a PDCP-C. The PDCP-C is mainly responsible for data encryption and decryption, integrity protection, data transmission, and the like on the control plane. The CU-UP is responsible for functions of a user plane, and mainly includes an SDAP and a PDCP-U. The SDAP is mainly responsible for processing data of the core network and mapping a flow to a bearer. The PDCP-U is mainly responsible for encryption and decryption, integrity protection, header compression, serial number maintenance, data transmission, and the like on a data plane. The CU-CP is connected to the CU-UP through an E1 interface. The CU-CP representing a gNB is connected to the core network through an Ng interface, and is connected to the DU through an F1-C (control plane). The CU-UP is connected to the DU through an F1-U (user plane). Certainly, in another possible implementation, the PDCP-C is also on the CU-UP. It should be noted that the CU may be classified as an access network device, or may be classified as a core network (CN) device. This is not limited in this application.

In embodiments of this application, the terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in a non-public network, or the like.

The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may alternatively be a terminal device in an internet of things (IoT) system. IoT is an important part in future development of information technologies. A main technical feature of the IoT is to connect things to a network by using a communication technology, to implement an intelligent network for human-machine interconnection and thing-thing interconnection.

It should be understood that a radar system in FIG. 1 may alternatively be replaced with another communication system such as a Wi-Fi system or a satellite system. This is not limited in this application.

The following describes the technical solutions of this application in detail by using the radar system as an example.

FIG. 2 is a schematic flowchart of a method for reducing interference between a radar and an uplink frequency band according to this application.

S201: A first network device obtains a characteristic of a radar signal in a new SUL frequency band.

Optionally, the uplink frequency band herein may be the new SUL frequency band, and the new SUL frequency band in this embodiment of this application may be replaced with the uplink frequency band.

The first network device detects the radar signal and generates the characteristic of the radar signal. Alternatively, the first network device receives the characteristic of the radar signal from a second terminal device. Descriptions are separately provided below.

Optionally, the first network device processes, through short-time Fourier transform, wavelet transform, or the like, a signal collected in the new SUL frequency band, and detects the radar signal according to a radar signal identification method, to obtain the characteristic of the radar signal. The radar signal identification method includes a threshold detection method, a mode identification method, or the like.

Optionally, the second terminal device processes, through short-time Fourier transform, wavelet transform, or the like, a signal collected in the new SUL frequency band, and detects the radar signal according to a radar signal identification method, to obtain the characteristic of the radar signal. Then, the terminal device sends the characteristic of the radar signal to the first network device through an air interface information element (for example, an RRC message). Correspondingly, the first network device obtains the characteristic of the radar signal. The second terminal device may be a terminal device operating in the new SUL frequency band, or may be a terminal device that does not operate in the new SUL frequency band, provided that the terminal device can measure the characteristic of the radar signal in the SUL. This is not specifically limited in this application.

Optionally, the characteristic of the radar signal includes a transmission cycle of the radar signal, a location of a frequency domain resource of the radar signal, and/or energy of interference to the first network device in the transmission cycle and/or on the frequency domain resource.

Optionally, the transmission cycle of the radar signal may be continuous or discontinuous.

It should be understood that the frequency domain resource of the radar signal is a part or all of the new SUL frequency band. It may be understood that the frequency domain resource on which the radar signal is located belongs to a frequency domain resource of the new SUL frequency band. On an overlapping frequency domain resource of the radar signal and the new SUL frequency band, the first network device is interfered by the radar signal.

It should be understood that because existence of the radar causes interference to more than one network device, optionally, the first network device may further send the obtained characteristic of the radar signal to at least one second network device. The second network device is a network device surrounding the first network device. For example, the first network device may notify a surrounding base station of the characteristic of the radar signal through an Xn interface or an Si interface, and the surrounding base station may take a protection measure. For specific content, refer to content of S202 and S203.

S202: The first network device determines a protection measure based on the characteristic of the radar signal.

The protection measure is used to reduce interference between the radar signal and the new SUL frequency band.

Optionally, the first network device may determine the corresponding protection measure through three types of decision-making units. The three types of decision-making units include a time domain decision-making unit, a frequency domain decision-making unit, and a space domain decision-making unit.

It should be understood that the time domain decision-making unit, the frequency domain decision-making unit, and the space domain decision-making unit may be virtual modules obtained through division based on implemented functions, or may be physical modules in the first network device. This is not specifically limited in this application.

Optionally, after obtaining the characteristic of the radar signal, the second network device may also determine the corresponding protection measure through a corresponding decision-making unit.

In the following descriptions, this application provides specific implementations of protection measures corresponding to the three types of decision-making units.

FIG. 3 is a schematic flowchart of implementing a time domain protection measure according to this application.

(1) The first network device determines, in the time domain decision-making unit based on the characteristic of the radar signal (for example, the transmission cycle of the radar), whether a current moment is in the transmission cycle of the radar signal. If the current moment is in the transmission cycle of the radar signal, go to step (2); if the current moment is not in the transmission cycle of the radar signal, go to step (3).

(2) If the current moment is in the transmission cycle of the radar signal, one or more of the following methods may be used to reduce interference of the radar signal:

1. The first network device stops user scheduling in a cell corresponding to the new SUL frequency band.

2. The first network device indicates that an uplink transmit power of one or more first terminal devices in the transmission cycle does not exceed a first threshold (for example, the first threshold may be a conservative value (−20 dB) of the uplink transmit power of the first terminal device). The first terminal device is a terminal device that communicates with the first network device through the new SUL frequency band.

Optionally, the first threshold may be determined by the network device, or may be determined by the terminal device based on an actual situation. This is not limited in this application. For example, the first network device may send indication information to the one or more first terminal devices, and the terminal device adjusts the uplink transmit power in the transmission cycle based on the indication information, to enable the uplink transmit power to not exceed the first threshold.

3. The first network device adjusts a length and/or a location of a cyclic prefix (cyclic prefix, CP), to enable the radar signal to fall in the CP.

For example, when an effective transmission period of the radar signal is less than the CP configured by the first network device, a frame offset is adjusted, to enable the radar signal to fall in the CP.

For another example, the first network device may adjust the length of the CP, to enable the length of the CP to be greater than or equal to the transmission cycle of the radar.

4. The first network device adjusts a quantity and/or locations of one or more GAP symbols, to enable the radar signal to fall on the one or more GAP symbols. For example, the first network device adjusts a frame structure, and adds a call gap GAP symbol, to enable the radar signal to fall on the GAP symbol.

The one or more GAP symbols may be consecutive symbols or inconsecutive symbols. This is not limited in this embodiment of this application.

For example, the one or more GAP symbols are consecutive symbols, and the first network device may adjust a length of the one or more GAP symbols, to enable the length of the one or more GAP symbols to be greater than or equal to the transmission cycle of the radar.

(3) After the method 1 or 2 is performed, if the current moment is not in the transmission cycle of the radar signal, the user scheduling in the cell corresponding to the new SUL frequency band is normally performed, or the uplink transmit power of the terminal device is adjusted to a previous normal value.

Figure 4:
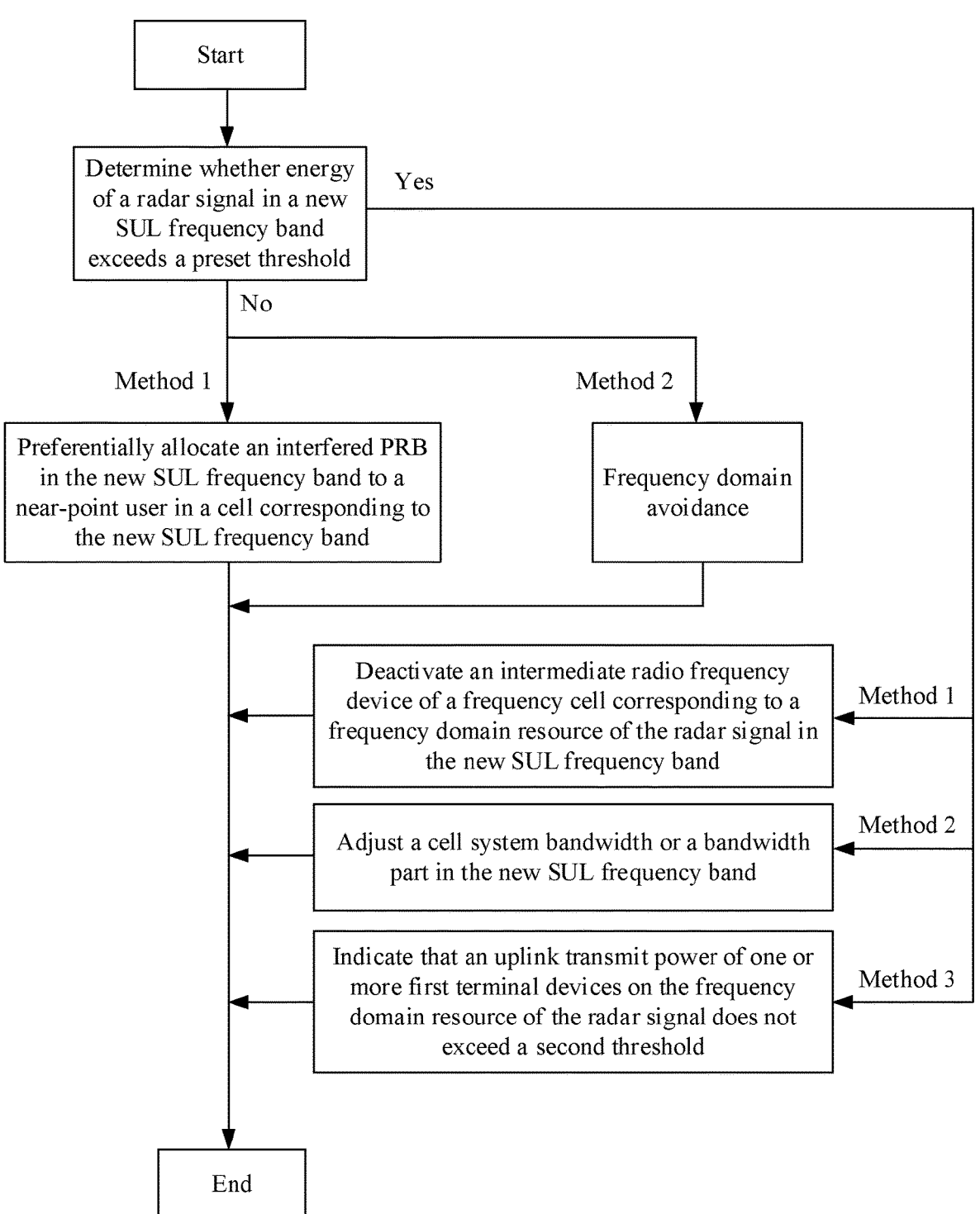
FIG. 4 is a schematic flowchart of implementing a frequency domain protection measure according to this application.

FIG. 4 is a schematic flowchart of implementing a frequency domain protection measure according to this application.

(1) Optionally, the first network device determines, in the frequency domain decision-making unit based on the characteristic of the radar signal (for example, the location of the frequency domain resource of the radar signal and energy of interference on the frequency domain resource), whether energy (or a radar interference level) of the radar signal on the new SUL frequency band exceeds a preset threshold. If the energy of the radar signal on the new SUL frequency band exceeds the preset threshold, go to step (2); if the energy of the radar signal on the new SUL frequency band does not exceed the preset threshold, go to step (3).

(2) One or more of the following methods may be used to reduce interference of the radar signal:

1. Deactivate an intermediate radio frequency device of a frequency cell corresponding to the frequency domain resource of the radar signal in the new SUL frequency band, or directly power off the first network device, where deactivation may be understood as not operating, being power-off, entering a sleep state, or the like. 2. Adjust a cell system bandwidth or a bandwidth part (BWP) in the new SUL frequency band.

Optionally, after the cell system bandwidth or the bandwidth part in the new SUL frequency band is adjusted, the cell system bandwidth or the bandwidth part in the new SUL frequency band may avoid the frequency domain resource on which the radar signal is located.

3. Indicate that an uplink transmit power of one or more first terminal devices on the frequency domain resource of the radar signal does not exceed a second threshold.

Optionally, the second threshold may be determined by the network device, or may be determined by the terminal device based on an actual situation. This is not limited in this application.

For an indication manner of the first network device, refer to content in the time domain protection measure.

(3) One or more of the following methods may be used to reduce interference of the radar signal:

1. The first network device preferentially allocates an interfered physical resource block (PRB) (namely, the frequency domain resource of the radar signal) in the new SUL frequency band to a near-point user in the cell corresponding to the new SUL frequency band.

2. The first network device performs frequency domain avoidance for the radar signal, where the frequency domain avoidance includes skipping scheduling an interfered PRB in the new SUL frequency band.

Optionally, in the method in FIG. 4, step (i) may not exist. In other words, that the first network device determines, in the frequency domain decision-making unit based on the characteristic of the radar signal, whether the energy of the radar signal in the new SUL frequency band exceeds the preset threshold is not performed, and one or more frequency domain protection measures in steps (2) and (3) are directly performed.

Figure 5:
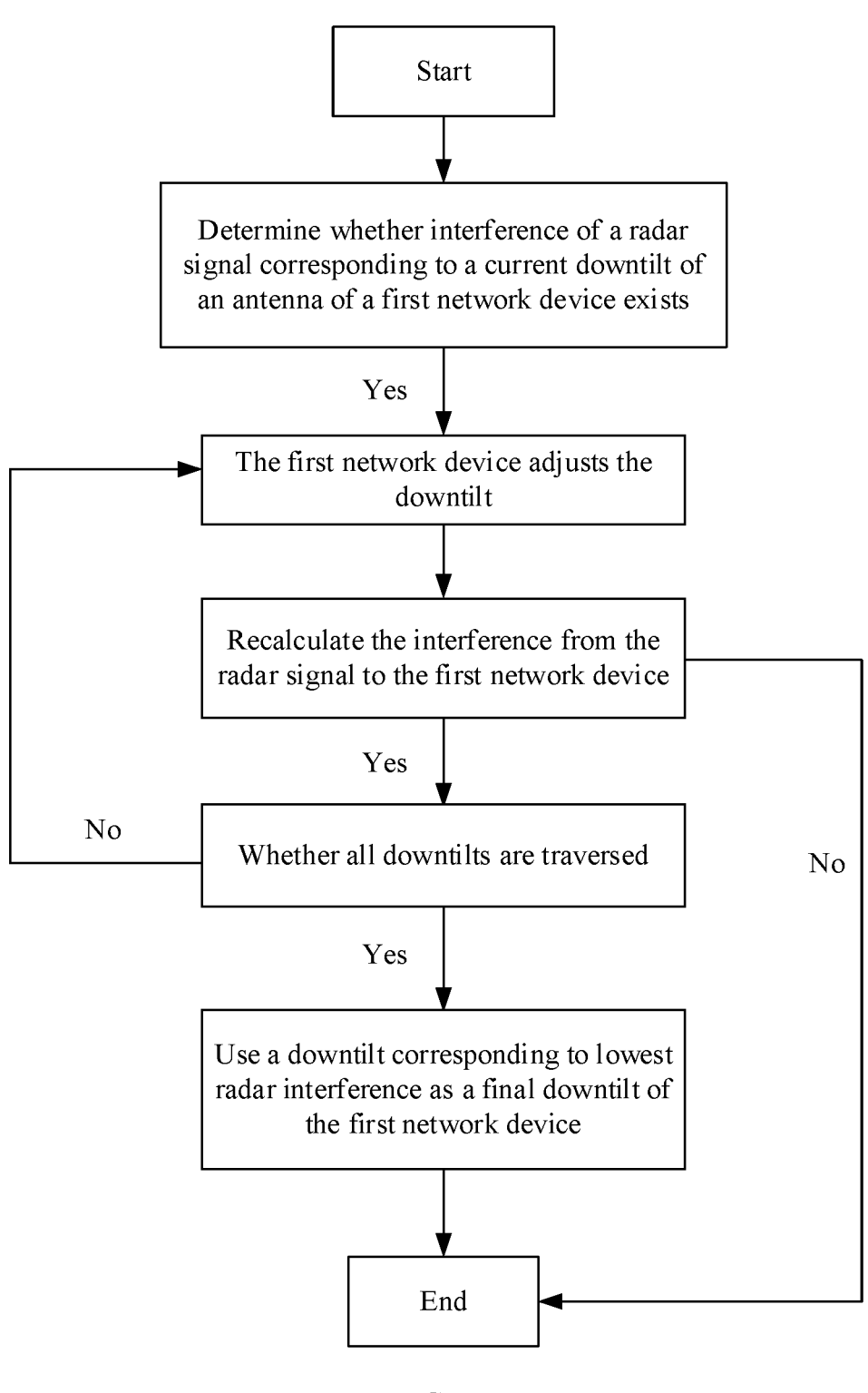
FIG. 5 is a schematic flowchart of implementing a space domain protection measure according to this application.

FIG. 5 is a schematic flowchart of implementing a space domain protection measure according to this application.

In the method in FIG. 5, the first network device may adjust a downtilt of an antenna of the first network device, to enable interference from the radar signal to the first network device to be less than a third threshold. For example, when the interference of the radar signal is less than the third threshold, it may be considered that the first network device detects no radar interference (in other words, the radar interference does not exist). The following provides descriptions with reference to specific steps.

(1) The first network device determines, in the space domain decision-making unit based on the characteristic of the radar signal, whether interference, of the radar signal, corresponding to a current downtilt of the antenna of the first network device exists. If the interference exists, go to step (2); if the interference does not exist, tasks such as user scheduling in a cell of a terminal device is normally performed.

(2) The first network device adjusts the downtilt of the antenna, where the downtilt includes an electrical downtilt and a mechanical downtilt. The electrical downtilt is used as an example. The first network device may correspondingly and continuously increase the electrical downtilt in a backend (for example, the first network device may decrease the electrical downtilt by 1 degree each time, and an adjusted degree is not limited), to reduce a receive gain and a transmit gain of the antenna of the network device in a direction of the radar interference.

(3) After adjusting the downtilt, the first network device recalculates the interference from the radar signal to the first network device. In this case, if no radar interference is detected, the first network device stops adjusting the downtilt; if the radar interference can still be detected, the first network device continues to adjust the downtilt. It should be understood that if the interference of the radar signal still exists after the first network device has traversed all downtilts, a downtilt with lowest radar interference is determined among all the downtilts traversed by the first network device, and the downtilt corresponding to the lowest radar interference is used as a final downtilt of the first network device. Therefore, the interference of the radar signal is reduced.

Optionally, in step (1), the first network device may also determine whether radar interference corresponding to the antenna of the first network device is less than the third threshold. If the radar interference is not less than the third threshold, go to step (2) to adjust the downtilt of the first network device; if the radar interference is less than the third threshold, the tasks such as the user scheduling in the cell of the terminal device is normally performed. Details are not described herein again.

Optionally, the first network device may use one or more of the time domain, frequency domain, and space domain protection measures. This is not limited in this application.

S203: The first network device performs the protection measure to reduce interference between the radar signal and the uplink frequency band.

S204: The first network device communicates with one or more first terminal devices through the new SUL frequency band.

Compared with a conventional technology, in this technical solution protected in this application, when the first network device performs the protection measure and 5G communication collides with the radar in time domain and frequency domain of the SUL frequency band, the 5G communication and the radar can still coexist. In other words, the first network device can still communicate with the terminal in the new SUL frequency band. This improves utilization of a wireless spectrum.

Optionally, in S205, after using the protection measure, the first network device re-evaluates whether the interference of the radar signal still exists. When the interference still exists, the first network device repeatedly uses the protection measure to reduce the interference between the radar signal and the new SUL frequency band.

In the foregoing technical solution, a problem of coexistence of a 5G system and the radar in a same frequency band is resolved by using the time domain, frequency domain, and space domain protection measures for reducing the interference between the radar and the uplink frequency band. In addition, the technical solutions of this application are all performed on a network device side and a terminal device side, so that there is no need to have permission of controlling the radar. In addition, a transmit power of the radar is extremely high. When the network device or the terminal device detects that an interference signal of the radar exists, an SUL terminal device does not cause interference to the radar. Therefore, there is no law and regulation violation risk when the present invention is used.

The foregoing describes in detail the method for reducing the interference between the radar and the uplink frequency band provided in this application. The following describes communication apparatuses provided in this application. It should be noted that FIG. 6 is merely an example, and a first network device may have units that are in a one-to-one correspondence with the steps in the foregoing method.

Figure 6:
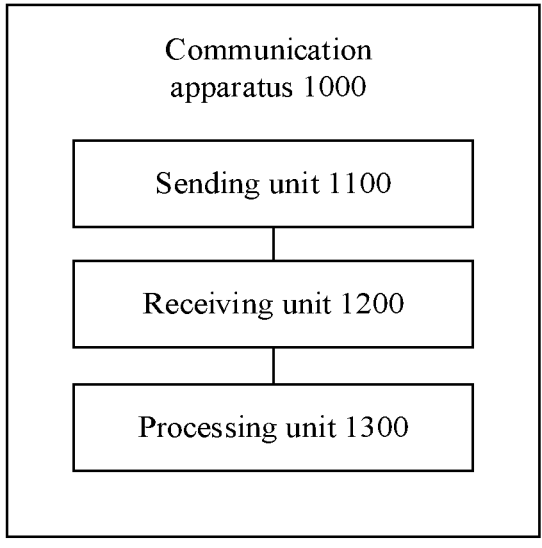
FIG. 6 is a schematic block diagram of a communication apparatus 1000 according to this application.

FIG. 6 is a schematic block diagram of a communication apparatus 1000 according to this application. As shown in FIG. 6, the communication apparatus 1000 includes a processing unit 1300.

The processing unit 1300 is configured to: obtain a characteristic of a radar signal in an uplink frequency band; determine a protection measure based on the characteristic of the radar signal; reduce interference between the radar signal and the uplink frequency band by using the protection measure; and communicate with one or more first terminal devices through the uplink frequency band.

Optionally, the communication apparatus 1000 may further include a sending unit 1100 and a receiving unit 1200, which are respectively configured to perform sending and receiving actions performed by the first network device.

Optionally, the processing unit 1300 is specifically configured for the first network device to determine the characteristic of the radar signal.

Optionally, the receiving unit 1200 is configured to receive the characteristic of the radar signal from a second terminal device.

Optionally, the sending unit 1100 is configured to send the characteristic of the radar signal to at least one surrounding second network device.

Optionally, the characteristic of the radar signal includes a transmission cycle of the radar signal, a location of a frequency domain resource of the radar signal, and/or energy of interference to the first network device in the transmission cycle and/or on the frequency domain resource.

Optionally, in the transmission cycle of the radar signal, the processing unit 1300 is further configured to: stop user scheduling in a cell corresponding to the uplink frequency band, or indicate that an uplink transmit power of the one or more first terminal devices in the transmission cycle does not exceed a first threshold. Alternatively, the processing unit 1300 is further configured to adjust a length and/or a location of a CP, to enable the radar signal to fall in the CP. Alternatively, the processing unit 1300 is further configured to adjust a quantity and/or locations of one or more GAP symbols, to enable the radar signal to fall on the one or more GAP symbols.

Optionally, the processing unit 1300 is further configured to: deactivate an intermediate radio frequency device corresponding to the frequency domain resource, or adjust a cell system bandwidth or a bandwidth part BWP in the uplink frequency band, to avoid the frequency domain resource or indicate that an uplink transmit power of the one or more first terminal devices on the frequency domain resource does not exceed a second threshold. Alternatively, the processing unit is further configured to: skip scheduling the frequency domain resource, or preferentially allocate the frequency domain resource to a near-point user in the cell corresponding to the uplink frequency band.

Optionally, the processing unit 1300 is further configured to adjust a downtilt of an antenna of the first network device, to enable interference from the radar signal to the first network device to be less than a third threshold.

Optionally, the processing unit 1300 is further configured to repeatedly use the protection measure in the foregoing method embodiment to reduce the interference between the radar signal and the uplink frequency band.

Optionally, the sending unit 1100 and the receiving unit 1200 may alternatively be integrated into a transceiver unit, which has both a receiving function and a sending function. This is not limited herein.

In an implementation, the communication apparatus 1000 may be the first network device in the method embodiment.

In this implementation, the sending unit 1100 may be a transmitter, and the receiving unit 1200 may be a receiver. Alternatively, the receiver and the transmitter may be integrated into a transceiver. The processing unit 1300 may be a processing apparatus.

In another implementation, the communication apparatus 1000 may be a chip or an integrated circuit installed in the first network device. In this implementation, the sending unit 1100 and the receiving unit 1200 may be communication interfaces or interface circuits. For example, the sending unit 1100 is an output interface or an output circuit, the receiving unit 1200 is an input interface or an input circuit, and the processing unit 1300 may be a processing apparatus.

A function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 1000 performs an operation and/or processing performed by the first network device in the method embodiment. Optionally, the processing apparatus may include only the processor, and the memory configured to store the computer program is located outside the processing apparatus. The processor is connected to the memory through a circuit/wire, to read and execute the computer program stored in the memory. For another example, the processing apparatus may be a chip or an integrated circuit.

Figure 7:
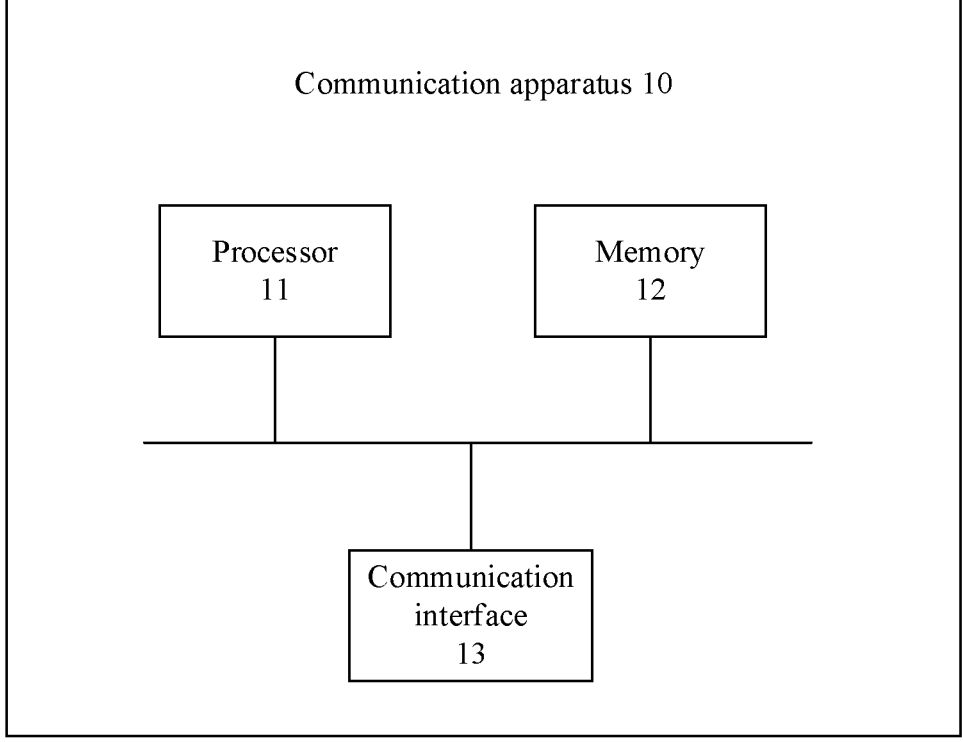
FIG. 7 is a schematic diagram of a structure of a communication apparatus 10 according to this application.

FIG. 7 is a schematic diagram of a structure of a communication apparatus 10 according to this application. As shown in FIG. 7, the communication apparatus 10 includes one or more processors 11, one or more memories 12, and one or more communication interfaces 13. The processor 11 is configured to control the communication interface 13 to receive and send a signal. The memory 12 is configured to store a computer program. The processor 11 is configured to invoke the computer program from the memory 12 and run the computer program. In this way, a procedure and/or an operation performed by the first network device in the method embodiment of this application are/is performed.

For example, the processor 11 may have a function of the processing unit 1300 shown in FIG. 6, and the communication interface 13 may have a function of the sending unit 1100 and/or the receiving unit 1200 shown in FIG. 6. Specifically, the processor 11 may be configured to perform processing or an operation internally performed by the first network device in the foregoing method embodiment, and the communication interface 13 is configured to perform a sending action and/or a receiving action performed by the first network device in the foregoing method embodiment.

In an implementation, the communication apparatus 10 may be the first network device in the method embodiment. In this implementation, the communication interface 13 may be a transceiver. The transceiver may include a receiver and a transmitter.

Optionally, the processor 11 may be a baseband apparatus, and the communication interface 13 may be a radio frequency apparatus.

In another implementation, the communication apparatus 10 may be a chip installed in the first network device. In this implementation, the communication interface 13 may be an interface circuit or an input/output interface.

Optionally, the processor and the memory in the foregoing apparatus embodiments may be physically independent units. Alternatively, the memory may be integrated with the processor. This is not limited in this specification.

This application further provides a computer-readable storage medium. The computer-readable storage medium stores computer instructions. When the computer instructions are run on a computer, operations and/or procedures performed by the first network device in the method embodiment of this application are performed.

This application further provides a computer program product. The computer program product includes computer program code or instructions. When the computer program code or the instructions are run on a computer, operations and/or procedures performed by the first network device in the method embodiment of this application are performed.

This application further provides a chip. The chip includes a processor. A memory configured to store a computer program is disposed independently of the chip, and the processor is configured to execute the computer program stored in the memory, so that an operation and/or processing performed by the first network device in any method embodiment are/is performed.

Further, the chip may include a communication interface. The communication interface may be an input/output interface, an interface circuit, or the like. Further, the chip may include the memory.

In addition, this application further provides a communication system, including the terminal device and the first network device in embodiments of this application.

A processor in embodiments of this application may be an integrated circuit chip, and has a signal processing capability. In an implementation process, steps in the foregoing method embodiment can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like. The steps of the method disclosed in embodiments of this application may be directly presented as being performed and completed by a hardware encoding processor, or performed and completed by a combination of hardware in the encoding processor and a software module. The software module may be located in a mature storage medium in the aft, such as a random access memory, a flash memory, a read-only memory, a programmable read-only memory, an electrically erasable programmable memory, or a register. The storage medium is located in a memory, and the processor reads information in the memory and completes the steps in the foregoing method in combination with the hardware of the processor.

A memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, RAMs in many forms are available, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory of the system and method described in this specification includes but is not limited to these and any memory of another proper type.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected based on an actual requirement to achieve the objectives of the solutions of embodiments.

In addition, functional units in embodiments of this application may be integrated into one processing unit. Alternatively, each of the units may exist alone physically. Alternatively, two or more units may be integrated into one unit.

The term "and/or" in this application describes only an association relationship between associated objects and represents that three relationships may exist. For example, A and/or B may represent the following three cases: Only A exists, both A and B exist, and only B exists. A, B, and C each may be singular or plural. This is not limited.

When the functions are implemented in a form of a software functional unit and sold or used as an independent product, the functions may be stored in a computer-readable storage medium. Based on such an understanding, the technical solutions in this application essentially, the part contributing to the conventional technology, or some of the technical solutions may be implemented in a form of a software product. The computer software product is stored in a storage medium, and includes several instructions for instructing a computer device (which may be a personal computer, a server, a network device, or the like) to perform a part or all of the steps of the method in embodiments of this application. The storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for reducing interference between a radar and an uplink frequency band, the method comprising:

detecting a characteristic of a radar signal transmitted by the radar in the uplink frequency band, the radar signal being received by a first network device of a cellular communication network or a second network device of the cellular communication network, wherein the cellular communication network comprises the first network device, the second network device, and one or more first terminal devices separate from the first network device and the second network device, the second network device is communicatively coupled to the first network device, the radar is separate from the cellular communication network, and detecting the characteristic of the radar signal comprises processing, by the first network device or the second network device, a signal in the uplink frequency band based on a radar signal identification method, the signal comprising the radar signal;

determining, by the first network device, a protection measure based on the characteristic of the radar signal;

reducing, by the first network device, interference between the radar signal and the uplink frequency band by using the protection measure; and communicating, by the first network device, with the one or more first terminal devices of the cellular communication network through the uplink frequency band, wherein communicating with the one or more first terminal devices comprises receiving one or more wireless uplink signals in the uplink frequency band from the one or more first terminal devices.

2. The method according to claim 1, wherein the detecting the characteristic comprises:

detecting, by the second network device, the characteristic of the radar signal; and receiving, by the first network device, the characteristic of the radar signal from the second network device.

3. The method according to claim 1, wherein the characteristic of the radar signal comprises a transmission cycle of the radar signal, a location of a frequency domain resource of the radar signal, and/or energy of interference to the first network device in the transmission cycle and/or on the frequency domain resource.

4. The method according to claim 3, wherein the protection measure comprises:

adjusting, by the first network device, a length and/or a location of a cyclic prefix (CP), to enable the radar signal to fall in the CP.

5. The method according to claim 3, wherein the protection measure further comprises:

deactivating an intermediate radio frequency device corresponding to the frequency domain resource.

6. The method according to claim 3, wherein the protection measure comprises:

adjusting a downtilt of an antenna of the first network device, to enable interference from the radar signal to the first network device to be less than a third threshold.

7. A non-transitory computer-readable storage medium storing a computer program comprising computer-executable instructions; and when the computer-executable instructions are executed, the method according to claim 1 is implemented.

8. A communication apparatus comprising:

a receiver configured to receive a radar signal transmitted by a radar;

a non-transitory memory storing a program; and a processor coupled to the non-transitory memory and configured to execute the program to detect a characteristic of the radar signal in an uplink frequency band from the radar signal, wherein the program comprises instructions that when executed by the processor cause the communication apparatus to:

determine a protection measure based on the characteristic of the radar signal, wherein the communication apparatus is part of a cellular communication network, the cellular communication network comprises the communication apparatus and one or more first terminal devices separate from the communication apparatus, the radar is separate from the cellular communication network, the characteristic of the radar signal is determined by processing a signal in the uplink frequency band based on a radar signal identification method, and the signal comprises the radar signal;

reduce interference between the radar signal and the uplink frequency band by using the protection measure; and communicate with the one or more first terminal devices of the cellular communication network through the uplink frequency band, wherein communicating with the one or more first terminal devices comprises receiving one or more wireless uplink signals in the uplink frequency band from the one or more first terminal devices.

9. The communication apparatus according to claim 8, wherein the characteristic of the radar signal comprises a transmission cycle of the radar signal, a location of a frequency domain resource of the radar signal, and/or energy of interference to the communication apparatus in the transmission cycle and/or on the frequency domain resource.

10. The communication apparatus according to claim 9, wherein the instructions to determine the protection measure further comprise instructions to:

in the transmission cycle of the radar signal, stop user scheduling in a cell corresponding to the uplink frequency band, or indicate that an uplink transmit power of the one or more first terminal devices in the transmission cycle does not exceed a first threshold;

adjust a length and/or a location of a cyclic prefix (CP), to enable the radar signal to fall in the CP; or adjust a quantity and/or locations of one or more GAP symbols, to enable the radar signal to fall on the one or more GAP symbols.

11. The communication apparatus according to claim 9, wherein the instructions to determine the protection measure further comprise instructions to:

deactivate an intermediate radio frequency device corresponding to the frequency domain resource, or adjust a cell system bandwidth or a bandwidth part BWP in the uplink frequency band, to avoid the frequency domain resource or indicate that an uplink transmit power of the one or more first terminal devices on the frequency domain resource does not exceed a second threshold; or skip scheduling the frequency domain resource, or preferentially allocate the frequency domain resource to a near-point user in a cell corresponding to the uplink frequency band.

12. The communication apparatus according to claim 9, wherein the instructions to determine the protection measure further comprise instructions to adjust a downtilt of an antenna of the communication apparatus, to enable interference from the radar signal to the communication apparatus to be less than a third threshold.

13. A non-transitory computer-readable storage medium storing computer instructions; and when the computer instructions are executed on a computer, the computer executes a method for reducing interference between a radar and an uplink frequency band, the method comprising:

detecting a characteristic of a radar signal transmitted by the radar in the uplink frequency band, the radar signal being received by a first network device of a cellular communication network or a second network device of the cellular communication network, wherein the cellular communication network comprises the first network device, the second network device, and one or more first terminal devices separate from the first network device and the second network device, the second network device is communicatively coupled to the first network device, the radar is separate from the cellular communication network, and detecting the characteristic of the radar signal comprises processing, by the first network device or the second network device, a signal in the uplink frequency band based on a radar signal identification method, the signal comprising the radar signal;

determining, by the first network device, a protection measure based on the characteristic of the radar signal;

reducing, by the first network device, interference between the radar signal and the uplink frequency band by using the protection measure; and communicating, by the first network device, with the one or more first terminal devices of the cellular communication network through the uplink frequency band, wherein communicating with the one or more first terminal devices comprises receiving one or more wireless uplink signals in the uplink frequency band from the one or more first terminal devices.

14. The method according to claim 3, wherein the protection measure comprises:

in the transmission cycle of the radar signal, stopping, by the first network device, user scheduling in a cell corresponding to the uplink frequency band.

15. The method according to claim 3, wherein the protection measure comprises:

indicating that an uplink transmit power of the one or more first terminal devices in the transmission cycle does not exceed a first threshold.

16. The method according to claim 3, wherein the protection measure comprises:

adjusting, by the first network device, a quantity and/or locations of one or more GAP symbols, to enable the radar signal to fall on the one or more GAP symbols.

17. The method according to claim 3, wherein the protection measure comprises:

adjusting a cell system bandwidth or a bandwidth part BWP in the uplink frequency band to avoid the frequency domain resource.

18. The method according to claim 3, wherein the protection measure comprises:

indicating that an uplink transmit power of the one or more first terminal devices on the frequency domain resource does not exceed a second threshold.

19. The method according to claim 3, wherein the protection measure comprises:

skipping scheduling, by the first network device, the frequency domain resource.

20. The method according to claim 3, wherein the protection measure comprises:

preferentially allocating the frequency domain resource to a near-point user in a cell corresponding to the uplink frequency band.

\* \* \* \* \*